United States Patent [19]

Gallagher

[11] 4,450,362
[45] May 22, 1984

[54] WIND ENERGY APPARATUS

[76] Inventor: Paul H. Gallagher, 2530 Crawford Ave., Evanston, Ill. 60201

[21] Appl. No.: 349,202

[22] Filed: Feb. 17, 1982

[51] Int. Cl.³ .......................... F03D 9/00; F03G 3/00
[52] U.S. Cl. ......................................... 290/55; 185/7
[58] Field of Search .................. 290/44, 55; 185/6, 7, 185/30, 32, 33

[56] References Cited

U.S. PATENT DOCUMENTS 2,534,411 12/1950 Bright ..................................... 185/7

*Primary Examiner*—B. Dobeck
*Assistant Examiner*—Shelley Wade
*Attorney, Agent, or Firm*—Paul H. Gallagher

[57] ABSTRACT

A windmill drives a drum having a cable coiled thereon, the cable holding a weight. The windmill lifts the weight, and the weight on dropping drives an AC generator. A plurality of drums and weights are mounted on a first common shaft connected with the AC generator, and a plurality of drive pulleys are mounted on a second common shaft connected with the windmill. Individual clutches selectively connect the drums/weights with the first shaft for driving the AC generator, and individual clutches selectively connect the drive pulleys with the second shaft.

1 Claim, 5 Drawing Figures

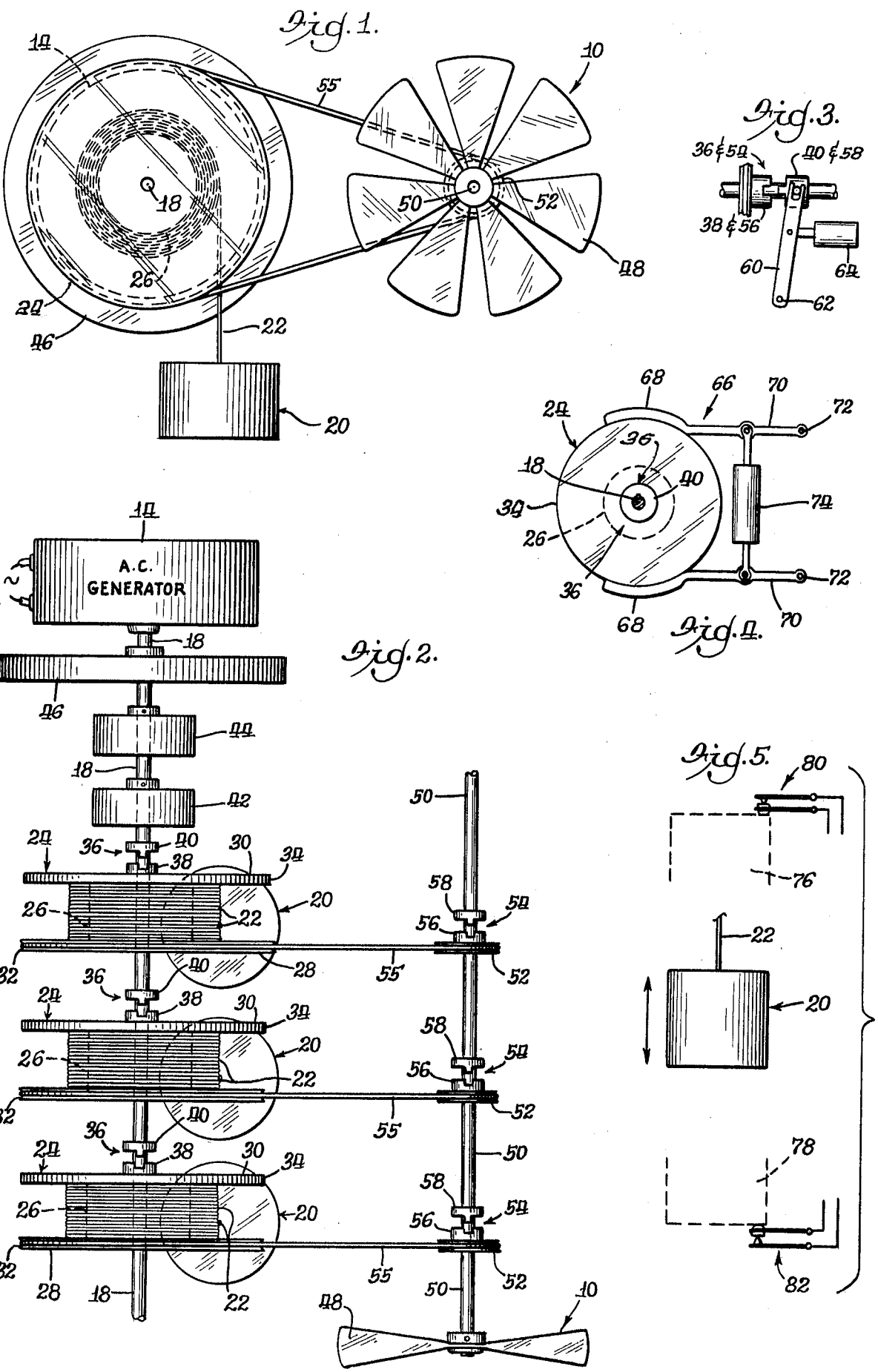

4,450,362

WIND ENERGY APPARATUS

OBJECTS OF THE INVENTION

A broad object of the invention is to provide novel apparatus and method for utilizing wind for driving a load, such as an AC generator, at a constant rate.

Another object is to provide the foregoing by storing the kinetic energy of the wind in the form of potential energy, and utilizing that potential energy for driving the load.

A more specific object is to provide the foregoing by utilizing the kinetic energy of the wind for lifting a weight, thereby storing potential energy in the weight, and thereafter controllably dropping the weight, and utilizing its potential energy for driving the AC generator at a constant rate.

DESCRIPTION OF A PREFERRED EMBODIMENT

In the drawings:

FIG. 1 is a side, axial view of the apparatus made according to the invention;

FIG. 2 is a top view of the apparatus of FIG. 1;

FIG. 3 is a detail view of a means for actuating a clutch;

FIG. 4 is a detail view of brake means; and

FIG. 5 is a semi-diagrammatic view of the weight that is lifted, and an arrangement for controlling operations in response to movement of the weight.

The windmill is shown at 10 and the load to be ultimately driven, is shown at 12. Since the primary purpose of the invention is to drive an AC generator at a constant rate, the load 12 is constituted by an AC generator 14 having an output 16. The generator is mounted on a shaft 18 which for convenience may also be referred to as a first common shaft.

The drawing shows the components in diagrammatic and suspended form, and it will be understood that various ones of the components are fixedly mounted for operating purposes.

The weight referred to above, is shown at 20 and this component is utilized for storing potential energy imparted thereto by the kinetic energy of the wind. The weight 20 may be of any suitable size and kind, and is mounted on a flexible cable 22 wound on a drum or spool 24. The drum includes a core 26 directly on which the cable is wound, and a pair of end plates or flanges 28, 30, the end plate 28 having a groove 32 forming a driven pulley for driving it, as referred to below. The plate 30 has a peripheral surface 34 for gripping of brake shoes thereon, as referred to below, and this plate may be of suitable dimensions to provide necessary strength for braking purposes.

FIG. 2 shows a plurality of drums 24 mounted on the first common shaft 18. There are three drums shown, and any number within a wide range may be utilized in accordance with practical considerations, but at least two are preferred for providing constant drive to the generator while any of the drums may be temporarily inactive, as referred to hereinbelow.

The drums 24 are free running on the shaft 18, and associated with each drum is a clutch 36 of known kind, having one part 38 fixedly secured to the drum and running free on the shaft, and the other part 40 fixed on the shaft and movable into and out of driving connection with the first part 38.

Mounted selectively on the shaft 18 is a brake component 42 of known kind utilized for selectively holding the shaft stationary against the tendency of any of the weights to rotate it. Another component 44 is mounted on the shaft 18 for regulating the speed of the shaft, and hence the speed of the generator, to the desired constant rate. A flywheel 46 may also be mounted on the shaft.

The windmill 10 may be of any known kind, and includes a windwheel 48 mounted on a shaft 50 which for convenience may also be referred to as the second common shaft. Mounted on the shaft 50 are a plurality of drive pulleys 52, the same in number as the drums 24, and a driven belt 55 is trained on each pulley and the drive pulley 28 of the corresponding drum. The pulleys 52 are free running on the shaft 50. Associated with each of the pulleys 52 is a clutch 54 which may be identical with the clutch 36, having a first part 56 secured to the pulley and running free on the shaft, and a second part 58 secured on the shaft and rotated therewith. As will be obvious, upon turning of the windmill by the wind, the shaft 50 is rotated, driving one or more of the pulleys 52, and through the drive belts 55, driving the drums 24. The driving of the pulleys 52 is effected through the clutches 54 while the drums drive the shaft 18 through the clutches 36.

FIG. 3 shows a convenient mechanism for actuating the clutches 36, 54. Secured to the movable part 40, 58 of each clutch is an arm 60 pivoted at 62 and actuated by a means such as a solenoid or hydraulic jack 64. Upon actuation of the solenoid, the arm 60 is swung to connect or disconnect the corresponding clutch. The actuating mechanism including the arm 60 and the solenoid 64 is provided for each of the clutches, that is, for each of the drums 24 and pulleys 52. The clutches are all individually actuatable, and they may be actuated as desired, either manually, or by suitable automatic controls of known kind.

FIG. 4 shows a brake means 66 for braking the drums 24, there being one such brake for each drum. The brake includes a pair of brake shoes 68 engageable with the end plate 30 of the drum, these shoes being mounted on arms 70 pivoted at 72. Interconnecting the arms is a double acting hydraulic jack 74 for moving the brake shoes into and out of active position.

FIG. 5 is a diagrammatic indication of a manner in which automatic controls may be provided. The weight 20 is shown, having upper and lower extreme positions 76, 78 and when the weight reaches these positions, it actuates switches 80, 82 for performing desired controls, including actuation of the clutches 36, 54, and the brake means 66.

As stated in the overall statement of the operation of the apparatus, upon a wind occurring, the windmill 10 is driven, rotating the shaft 50, and upon connection of a clutch 54 the corresponding pulley 52 is driven, which acting through the drive belt 55 drives the corresponding drum 54. This is in the direction of winding up the cable, lifting the weight. After the weight has reached its maximum height, the switch 80 is actuated thereby, applying the brake means 66, and holding the weight in elevated position. To drive the AC generator 14, the corresponding clutch 36 is connected and the brake means 66 released. The weight 20 then drops and drives the generator. The components 42, 44 are actuated in accordance with desired control operation.

The design of the apparatus is that a single weight 20 is sufficient to operate the generator at the desired rate, and therefore in normal operation such single weight may be utilized for driving it, to the exclusion of the others, except that in the changeover phase from one weight to another, when a first weight has reached or is closely approaching its bottommost limit, and another that is in raised position, is to be connected. While a single weight is effective for driving the generator, the generator and the controls are such that two weights acting together will not impose a dangerous burden on the generator.

While normal operation may be produced, in most prevailing conditions, by two weights, it is desired that more than two weights be provided, for accommodating abnormal conditions, or for providing great storage capacity. Normally, a weight is lifted faster than it is dropped, and hence normally there is assurance that the second weight will be completely lifted and ready to be put into operation before the first weight has reached its lowermost position. A great and very distinctive advantage is that the kinetic energy of the wind can be continuously stored in the weights; wind is often erratic, ranging from high-wind conditions to low-wind conditions, but whatever that condition is, whatever kinetic energy is produced can be stored. A high wind may blow, for example, for a few hours and raise a weight, or on the other hand a low wind may have to blow for a day or two until the weight is raised. Nevertheless, even when the wind is low, it raises the weight a distance corresponding to the total kinetic energy of that wind. A greater number of weights, i.e., more than two, provides assurance for driving in long periods of lull, which conceivably could range over days, or weeks, or even months, and within practical considerations, there is no limit to the number of weights that may be utilized in connection with a single generator.

The apparatus is of very low cost character, and this is true even though a large number of weights are utilized, because the only cost involved is the original capital cost of building the apparatus, since the cost of operating it is minimal, consisting chiefly in maintenance.

The apparatus can be designed for enormous capacity. The weights 20 can be immense in size or mass, and they can be raised to great heights, both of these features being limited only by practical considerations.

It is within the scope of the invention to use a single weight in association with a generator, which would be practical in such cases where it is not necessary that the generator be run continuously, but only in on-off fashion.

I claim:

1. Energy generating apparatus comprising,
a load to be driven including a rotary member,
a horizontal first common shaft,
means operably connecting the first common shaft to the rotary member of the load,
a plurality of weights,
a plurality of drums individual to the weights, mounted on the first common shaft and free running thereon,
a cable secured to each weight and connected to the corresponding drum and capable of being wound on the drum, each drum including a pair of end plates forming flanges, a first of the flanges having a groove and constituting a driven pulley, and the second flange constituting a rotary braking member,
a clutch associated with each drum including a first part fixed to the drum and free running on the shaft and a second part fixed on the shaft for rotation therewith and axially slidable thereon into and out of driving connection with the first part,
a horizontal second common shaft parallel with the first common shaft,
a plurality of driving pulleys mounted on the second common shaft, individual to the drums and being free running on the shaft,
a clutch associated with each driving pulley including a first part fixed to the pulley and free running on the shaft, and a second part fixed on the shaft for rotation therewith and axially slidable thereon into and out of driving connection with the first part,
drive belts interconnecting the respective driving pulleys and driven pulleys,
brake means operably associated with each rotary braking member,
a windmill for driving the second common shaft,
the foregoing members being operable for enabling selectively and individually clutching the driving pulleys on the second common shaft for driving the respective drums and thereby winding up the corresponding cables thereon and lift the corresponding weights, and enabling selectively and individually clutching the drums to the first common shaft for rotating the latter and driving the load,
brake means operative for holding the first common shaft and thus the load stationary against the tendency of the weights to drive them, and
means operable for regulating the speed of rotation of the first common shaft and thus the load.

* * * * *